Oct. 25, 1960    W. G. MARSHALL ET AL    2,957,663
FUEL CELL ANCHORING CONTOUR WASHER

Filed May 14, 1956

INVENTORS.
WILLIAM G. MARSHALL
LEON G. LANE
BY
Reynolds, Beach & Christensen
ATTORNEYS

United States Patent Office 2,957,663
Patented Oct. 25, 1960

2,957,663
FUEL CELL ANCHORING CONTOUR WASHER

William G. Marshall and Leon G. Lane, Seattle, Wash., assignors to Boeing Airplane Company, Seattle, Wash., a corporation of Delaware Filed May 14, 1956, Ser. No. 584,509

1 Claim. (Cl. 244—135)

Bladder type fuel cells, used in aircraft, are in effect closed bags of flexible material which is impervious to the liquid fuel, and which are supported within an enclosed space of the airplane, with the cell walls resting upon the airplane structure and supported thereby. It is necessary to anchor such fuel cells in place at frequent intervals, and this is customarily done by extending cords or similar flexible members, which are attached at intervals to the exterior of the cell wall, through eyes which stand up from the supporting aircraft structure at similar intervals. These eyes can be made small or large. If small, they produce a small but pronounced and abrupt depression in the cell wall, and if large, the abruptness is less in one direction, but the depth of the depression is greater, and the abruptness just as great in the direction at ninety degrees to the first.

The cell walls are considered to be flexible, and are so under normal temperature conditions, but the low temperatures frequently encountered at high altitudes detract from its flexibility, and the fuel loads imposed upon the cell walls, as they are indented more or less abruptly by the anchoring eyes, tend to crack the cell walls, at low temperatures. These cracks tend to leak. There is also some tendency to wear caused by relative movement of the cell walls and the eyes, as the fuel sloshes about. Altogether, it has been found that this tendency to leakage, from such causes as have been mentioned, and especially from cracking, requires careful inspection of all parts of the fuel cells at frequent intervals, for which purpose they must be removed and replaced. Cracked or worn cells must be replaced. All this constitutes an appreciable expense, and if overlooked may cause great damage, even possibly complete loss of the airplane and its cargo and crew from explosion or fire.

The primary aim of the present invention is to provide an anchorage means for such bladder type fuel cells, which will greatly lessen the liability to crack at such points, or to wear, by decreasing greatly the abruptness of the depression in every case and in all directions, yet without in any way interfering with or weakening the anchorage of the fuel cell in place.

Secondarily, it is an object to do this by means of small, light, inexpensive and easily installed contour washers which surround and within which the outstanding eyes are submerged, and which creates so gentle and smooth a depression in the cell wall as greatly to minimize the liability to cracking.

The invention comprises the combination of the fuel cell and the supporting structure, together with the anchorage means consisting of the eye, the cord or other means attached to the fuel cell, threading through the eye, and the washer of a particular size, shape, and disposition assembled with relation to the eye and the cord. The invention includes also the washer per se.

The invention is shown in a typical form in the accompanying drawings, and will be described with relation to that form, in this specification, and the features which are claimed as new will be expressed in the accompanying claim.

Figure 1:
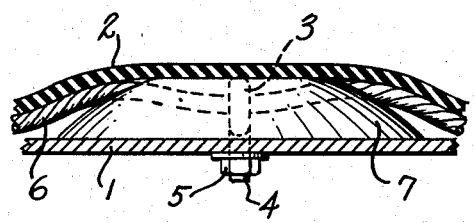
Figure 1 is a sectional view through a portion of the fuel cell wall and the supporting structure, showing the contour washer in elevation, in operative position with relation to the washer and to the anchoring cord.
Figure 2:
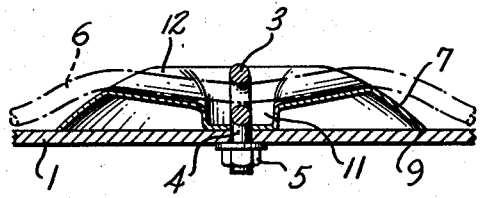
Figure 2 is a similar view but showing the contour washer in axial section.
Figure 3:
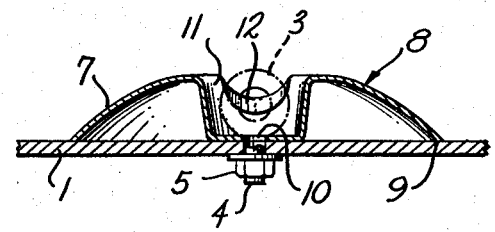
Figure 3 is a similar view, the viewpoint being at right angles to Figure 2.
Figure 4:
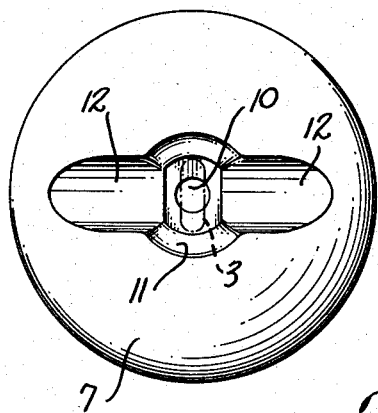
Figure 4 is a plan view of the washer itself.

The aircraft structure or other supporting structure is illustrated as the sheet or plate 1, and the wall of the fuel cell is indicated at 2. The showings are typical only, and are not intended to represent any particular type. Supported from and outstanding from the supporting structure 1 is the eye 3 of an eyebolt. Its shank 4 may extend through the supporting structure 1, and it may be secured in place by a nut 5, or by any suitable securing means.

The cell wall, as usual, has affixed to its exterior a cord, tape or similar flexible tensional member, indicated by the numeral 6. The manner of its affixation to the cell wall is immaterial. Frequently there will be a number of such eyes 3 supported in alignment, and a single cord 6 will extend through the several eyes, and through loops of flexible material affixed to the exterior of the cell wall.

It was the eyes 3 outstanding from the surface of the support 1 whereon the cell wall rests which, generally speaking, caused cracking of the cell wall, and consequent leakage, in prior installations. According to the present invention, a washer 7, which is of the form of a shallow blister, has a convex surface 8, and an opposite surface or marginal edge 9, which is preferably planar. This surface 9 in use rests upon the supporting structure 1, and the blister is of a depth approximately equal to the height of the eye 3 when the latter is in its operative position. The blister is formed with a central aperture 10, which preferably is of a size to receive snugly the shank 4 of the eye, and the washer is formed also with a central depression 11 surrounding the eye and within which the eye is almost if not completely submerged. Preferably, also, the convex surface of the washer is formed with a groove 12, extending generally diametrally at each side of the central depression 11. The depression 11, snugly receiving the eye 3, aligns the latter's opening with the groove 12. The groove 12 need be only of a depth to receive the cord 6, so that the latter does not protrude appreciably above the apex of the blister, where the cord is threaded through the eye 3.

As will be observed in the drawings, the washer 7 is conveniently and simply formed by stamping from sheet metal, although it is not necessarily so formed, but when it is so formed it is of light weight and relatively inexpensive. It can be made of other light material of adequate strength.

In making ready the anchorage for a fuel cell, the shank 4 of each eyebolt is inserted through the central aperture 10, and through holes drilled in the supporting structure 1, and the eyes are then secured in place, in proper alignment and orientation to receive the anchoring cord 6. These cords are threaded through the eyes and secured to the cell wall, and the installation is complete. The several contour washers will dimple the cell wall 2 but slightly, and gently in all directions, without any such abruptness as will cause the cell wall to crack. All the eyes 3 are submerged, and do not themselves come into appreciable contact with the cell wall. They may contact the cell wall slightly, but they do not dimple it abruptly nor appreciably, if at all.

We claim as our invention:

A washer for use in anchoring a bladder type fuel cell or the like to an aircraft or other supporting structure, through the medium of an eye of a given size outstanding from the supporting structure and a cord affixed to the cell wall and threaded through such eye, said washer comprising a circular body having a convex surface and an opposite flat surface, and having a central aperture through and a depression in its convex surface, of a size and depth to receive and submerge the eye, said washer having also a groove directed transversely of its convex surface, at each side of its central depression, for alignment with the axis of the eye which fits within the central depression.

References Cited in the file of this patent

UNITED STATES PATENTS

| | | |
|---|---|---|
| 623,681 | Mooney | Apr. 25, 1899 |
| 1,321,742 | Hendricks | Nov. 11, 1919 |
| 1,691,638 | Carney | Nov. 13, 1928 |
| 1,719,136 | Rosenberg | July 2, 1929 |

FOREIGN PATENTS

| | | |
|---|---|---|
| 626,444 | Great Britain | July 14, 1949 |
| 885,268 | France | May 24, 1943 |